Nov. 11, 1969  P. F. ANDERSEN  3,477,233
WAVE MACHINE INSTALLATIONS
Filed March 7, 1966  6 Sheets-Sheet 1

INVENTOR
PER F. ANDERSEN
BY Maybee & Legris
ATTORNEYS

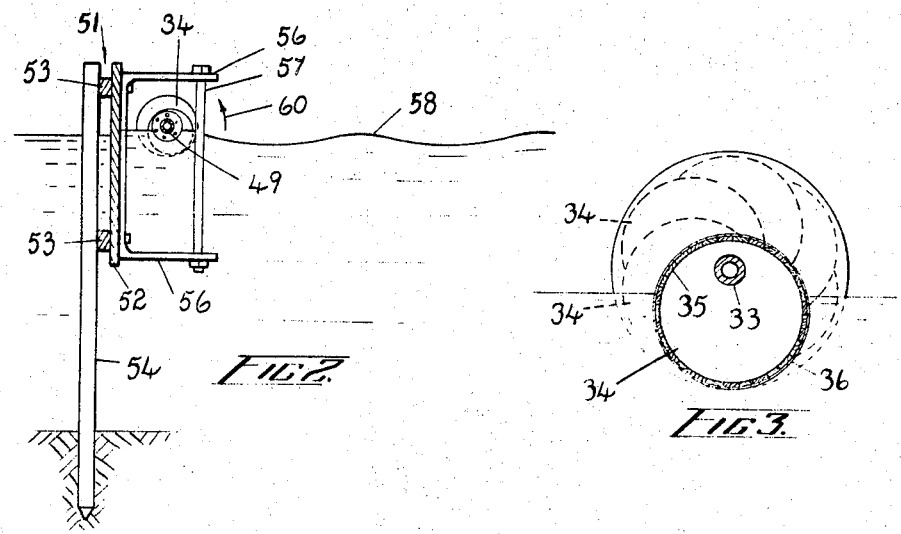
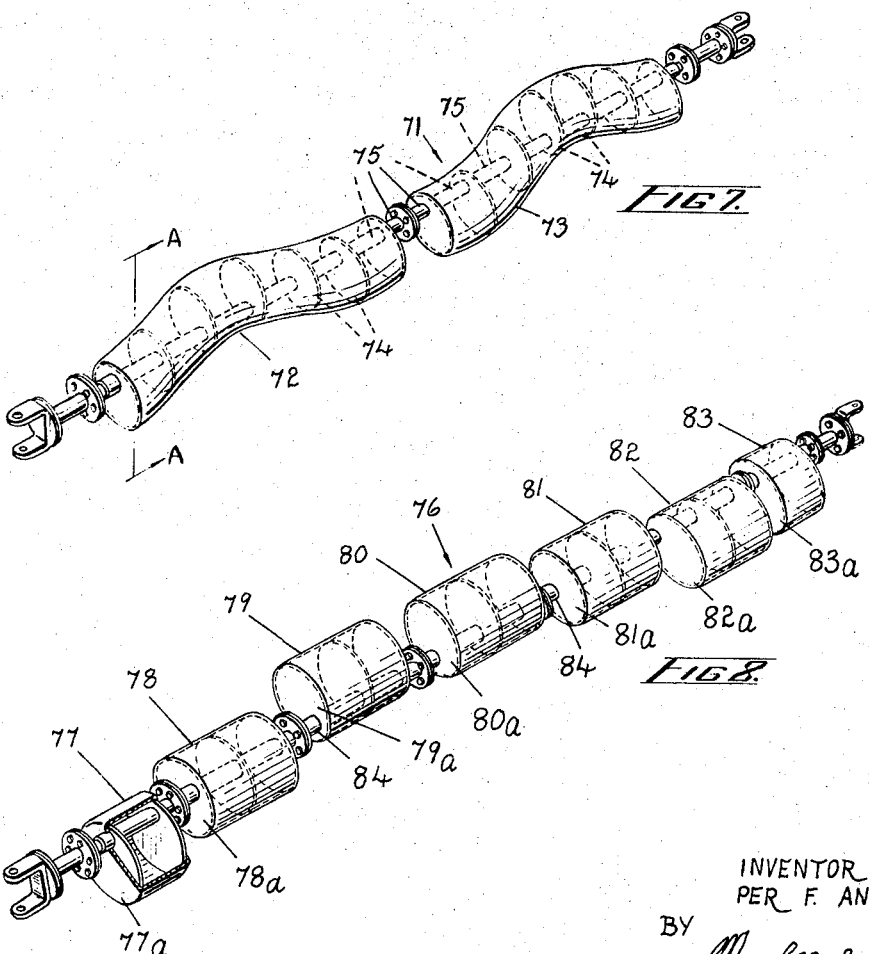

INVENTOR
PER F. ANDERSEN
BY Maybee & Legris
ATTORNEYS

INVENTOR
PER F. ANDERSEN
BY Maybee & Legris
ATTORNEYS

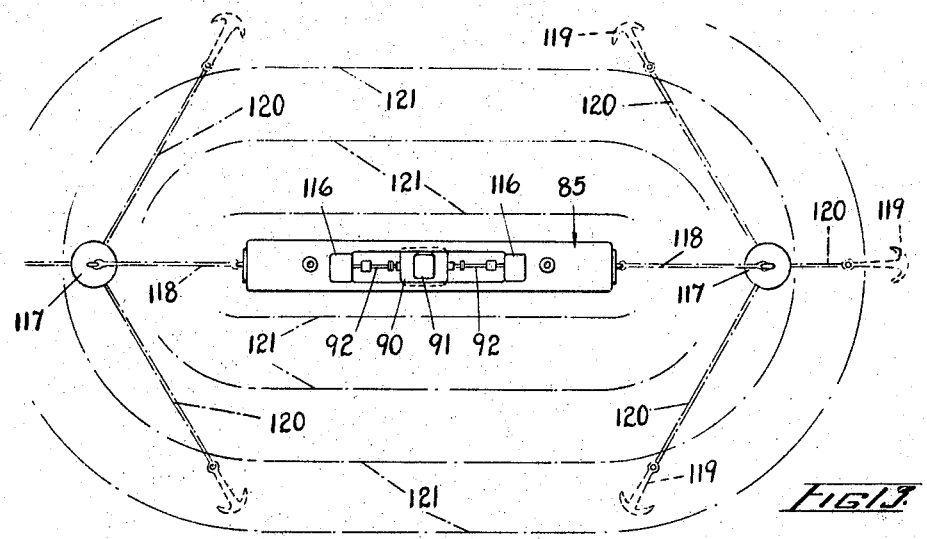
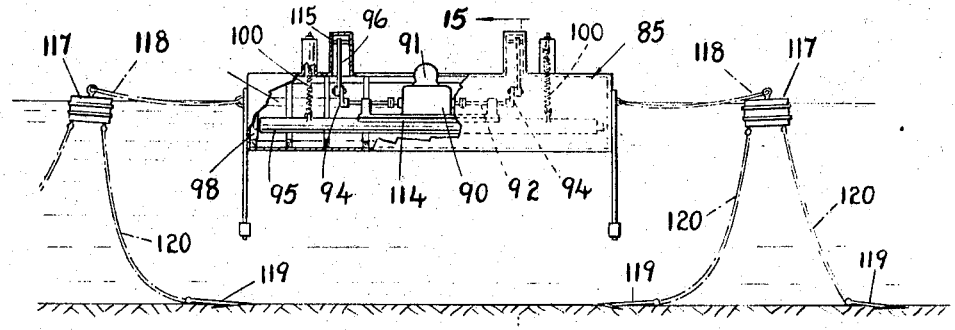
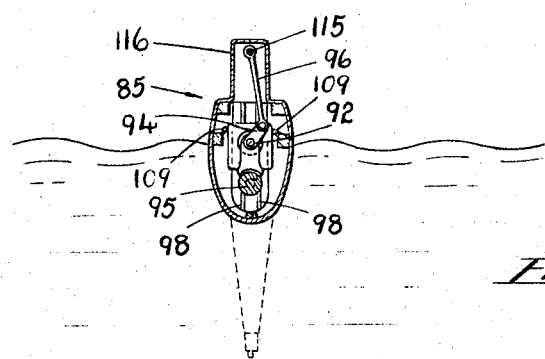

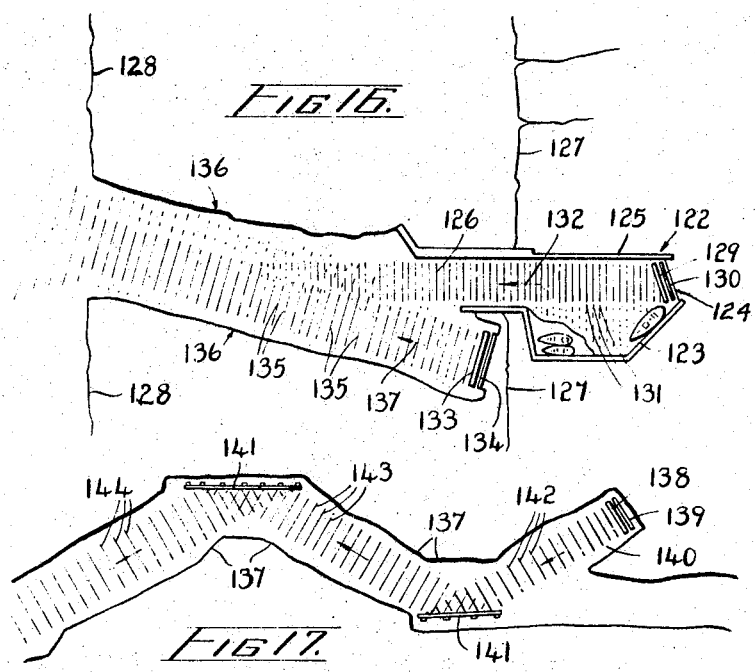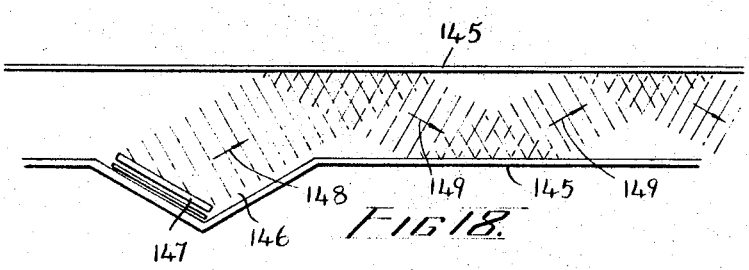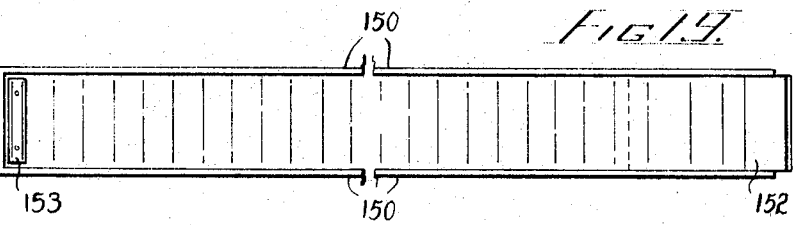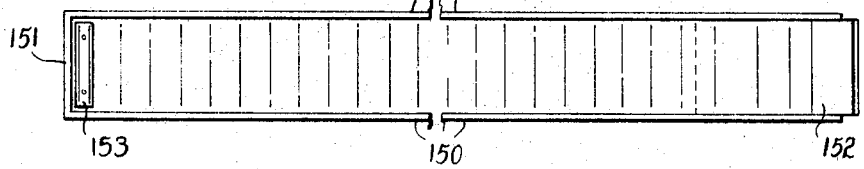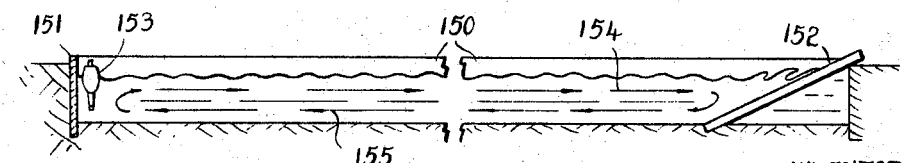

United States Patent Office 3,477,233
Patented Nov. 11, 1969

3,477,233
WAVE MACHINE INSTALLATIONS
Per F. Andersen, 200 Roehampton Ave., Apt. 914,
Toronto, Ontario, Canada
Filed Mar. 7, 1966, Ser. No. 532,309
Int. Cl. E02b *15/02, 3/00;* E04h *3/20*
U.S. Cl. 61—1                                   15 Claims

ABSTRACT OF THE DISCLOSURE

The specification discloses machines for making gravity waves on the free surface of a body of liquid by the periodic motion of a buoyant member which is free to rise and fall with changes in the level of said surface. The buoyant member may be elongated and rotated about an axis parallel to its elongated direction by driving means separate from the member. Alternatively, the buoyant member may carry driving means and a weight, the driving means being arranged to move the weight relative to the buoyant member. The disclosure describes the machines as being used for keeping a channel or harbour free from ice.

---

This invention relates to machines for making gravity waves on the free surface of a body of liquid. The invention also relates to transportation of floating matter, sanitary improvements of water with free surface and ice prevention in waterways.

I have found that wave making machines have certain useful applications not recognized before. The usefulness of this invention is related to the flow mechanics of gravity waves on the free surface of a liquid.

It is well known that waves on a liquid surface will cause oscillatory motions of particles in the upper layers of the liquid. Superimposed on the oscillatory motions, progressive waves also produce progressive motions in the liquid, known as "mass transport." The particles in the upper layers of the liquid thus move generally in the direction of wave propagation, resulting in compensating flows at lower depth or outside the area covered by the waves.

Wave action will also produce mixing of liquid, and it will be found that gravity wavs will produce a systematic change of liquid at the surface.

In most liquids the decay of wave energy due to the action of fluid friction is negligible since the differential motions of neighboring particles in the liquid caused by wave action are extremely small, and it is known for example that a system of large waves on deep water will travel almost indefinitely.

Waves produced by a wave machine, which of its nature must be of limited width, will form a so-called wave train. On a liquid surface of unlimited expanse a wave train will increase its width with distance from the wave machine due to diffraction of the waves and thus will cause a reduction in the height of the waves.

It is already known that the decay of wave height due to diffraction is reduced when the wave machine is very long. I have also found that diffraction, and hence decay of wave height, can be reduced when the horizontal projection of the wave crest follows a slight curve which is concave towards the direction of wave propagation.

Both the mass transport and the mixing which accompany wave action produced by a wave machine can be put to useful purposes.

The mass transport will provide a slow transport of matter located in the wave train to points far distant from the wave machine, and may serve in water transportation of floating goods ranging from pulpwood to low density fluids, or in moving floating debris or contaminated matter.

The mixing which accompanies wave action will prevent stagnation and temperature stratification in the liquid and will provide aeration of the liquid. In a body of water the aeration will tend to remove gases and odours caused by decomposition matter, thus purifying the water and improving it for consumption and for fish life.

I have also discovered that wave machines can be useful in controlling ice conditions on a water surface. The exchange of surface water created by wave action will delay the initial ice formation until after a substantial amount of water has been cooled to the freezing point. In fresh water this will, in some locations, be sufficient to prevent ice formation completely. If ice formation does take place, the mixing action at the surface will disperse the ice as it is formed and the ice will remain suspended as colloidal ice in the upper layers of the the water. The ice particles will take part in the mass transport induced by the waves and they may either melt, if they reach warmer water, or they may agglomerate and grow to form frazil ice and slush. Frazil ice and slush which float on the surface will also take part in the mass transport and, depending on conditions, may either melt or compile at the end of the wave run.

I have also found that wave action can break up an ice sheet when the wave height exceeds about four to five times the thickness of the ice sheet. On a water surface covered with a pack of ice chunks, artificial wave action can prevent the ice chunks from freezing together to form a continuous ice cover. With waves which are large compared with the ice chunks, the broken ice may also be transported by the mass transport and packed at the end of the wave run. I also have found that wave action will increase the speed of melting of floating ice when natural conditions for melting are present.

In a body of liquid with a free surface, it will be found that a local variation in displacement of liquid at or near the surface will generate waves on the liquid, and that a "steady" wave pattern will develop if any such variation is repeated periodically. Existing wave machines described in patents and in other literature, as well as wave machines constructed in accordance with this invention, function according to thi principle. However, the existing wave machines are connected to the bed of the body of liquid, on which they are to produce waves, in such a way that their moving parts follow fixed paths, and unless adjusted, their porformances are affected by changes in the liquid level; in contradistinction, the wave machines of the present invention float on the surface of the liquid, so that their performances are not affected by changes in the liquid level.

According to the invention I provide a machine for making waves on the free surface of a body of liquid comprising a member which is buoyant in the liquid and which, when the machine is in use is at least partially immersed in the liquid and floats thereon, driving means associated with the buoyant member to cause a periodic motion thereof relative to the surface of the liquid such that the amplitude of said motion relative to the surface is unaffected by the level of the latter, such relative motion causing substantial variations in the liquid displacement of the buoyant member, and locating mean for preventing movement of the buoyant member across the surface of the liquid outside predetermined limits while allowing said vertical movements of the buoyant member.

It is an object of the invention to provide methods and means for producing useful mass transport by wave action on the free surface of a body of liquid, for the purpose of transporting matter which is floating on the liquid.

It is another object of the invention to provide means for exchanging liquid at the free surface of a body of liquid by wave action for the purpose of aerating the liquid.

It is a further object of the invention to provide means for controlling or preventing ice conditions in waterways by wave action.

These and other objects of the invention will be apparent from the following description of embodiments of the invention which are described by example with reference to the accompanying drawing in which:

FIGURE 2 is a cross-sectional view on the line 2–2 of FIGURE 1;

FIGURE 3 is a cross-sectional view on the line 3–3 of FIGURE 1;

FIGURE 7 is a perspective view of a buoyant member which can be substituted for the buoyant members of the wave machines shown in FIGURES 1 and 4;

FIGURE 8 is a perspective view of another alternative buoyant member of the wave machine shown in FIGURES 1 and 4;

FIGURE 13 is a plan view of a still further embodiment of the invention arranged to produce waves in all directions simultaneously;

FIGURE 14 is a side elevation, partly broken away, of the machine of FIGURE 13;

FIGURE 15 is a cross-sectional view taken on the line 15–15 of FIGURE 14;

FIGURE 16 is a plan view of a typical harbour with two wave machine installations and showing the wave action diagrammatically;

FIGURE 17 is a plan view of a portion of a river showing a wave machine installation;

FIGURE 18 is a plan view of a portion of a canal showing a wave machine installation;

FIGURE 19 is a plan view of a rectangular tank having a wave machine installation; and FIGURE 20 is a vertical cross-sectional view of the tank of FIGURE 19.

Figure 1:
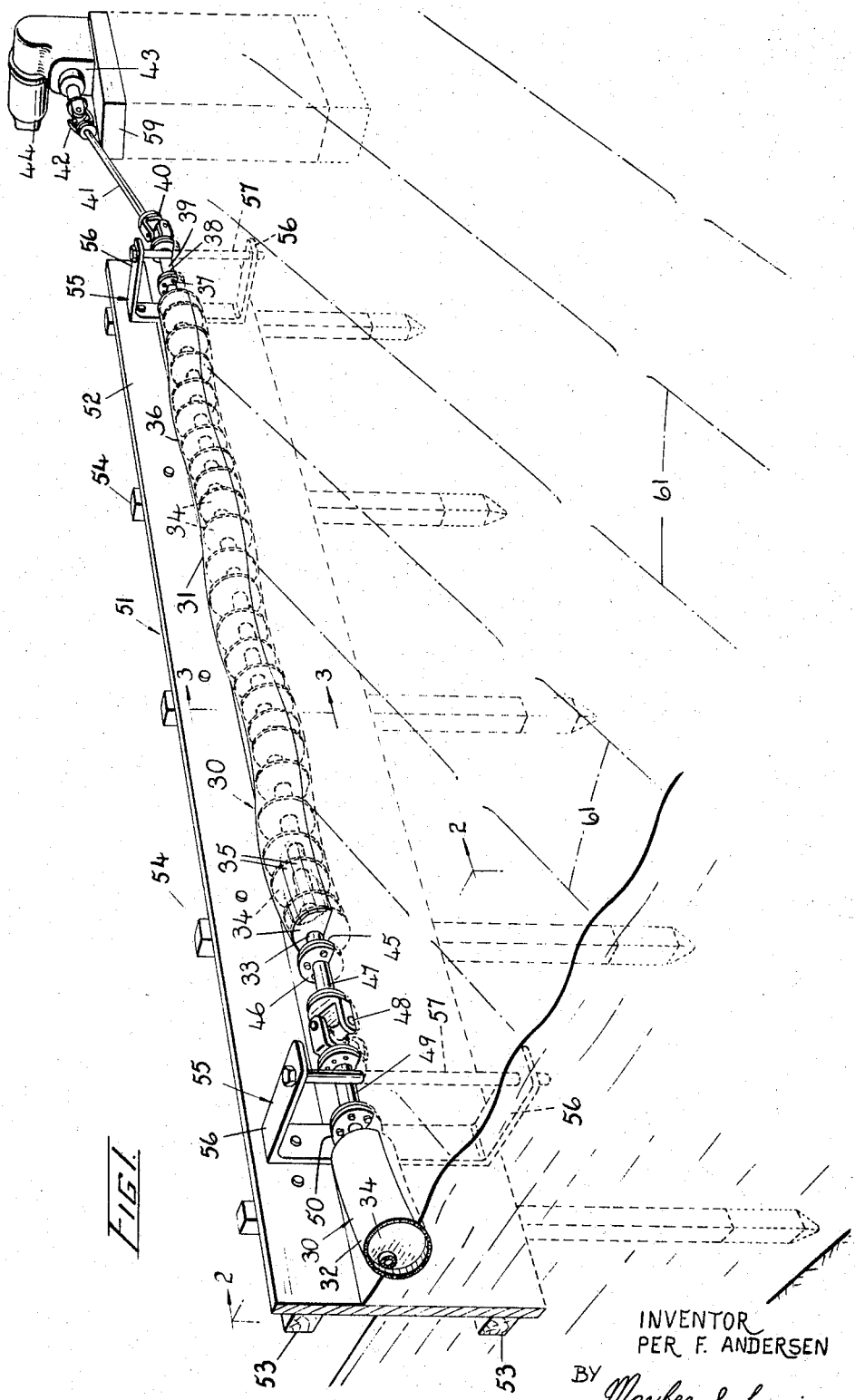
FIGURE 1 is a perspective view of a first embodiment of a wave machine constructed in accordance with the invention and arranged to produce waves to one side only.

Referring now to FIGURES 1, 2 and 3, the wave machine includes one or more buoyant members indicated generally at 30; two buoyant members are indicated specifically at 31 and 32. Each buoyant member is of circular cross-section, the cross-section being constant along the length of the buoyant member, but the centres of adjacent cross-sections lie on a helix which extends longitudinally of the buoyant member.

Referring to the buoyant member 31, it is constituted by a hollow haft 33 which passes through and to which are attached a plurality of circular plywood discs, some of which are indicated at 34. The discs are secured in position on the shaft by adhesive. Laths 35 are secured to the peripheries of the discs 34 and are glued in position. The reulting frame is covered by a reinforced plastic, which may be constituted by a fibrous glass roving wound from end to end of the frame and impregnated with a liquid polyester resin which when catalyzed will cure to a hard solid. The reinforced plastic provides a watertight covering 36 of the buoyant member, which covering gives the member strength and buoyancy.

It will be seen that since the centres of the discs 34 are arranged on a helix, the covering 36 will define a helical elongated rod. The number of turns of the helix followed by a line passing through the centres of the disc 34 is, as shown in FIGURE 1, a whole number from one end of the bouyant member 31 to the other. More specifically, the buoyant member 31 has three complete turns of the helix.

At its righthand end in FIGURE 1, the shaft 33 is provided with a flange coupling 37 which is connected to a similar flange coupling 38 on a short extension shaft 39. The shaft 39 in turn is connected to a universal joint 40 which also is connected to a drive shaft 41. The drive shaft 41 is connected at its other end to a universal joint 42, which is connected to a reduction gear 43 driven by an electric motor 44.

At its other end, the shaft 33 is provided with a flange coupling 45 connected to a flange coupling 46 on a short extension shaft 47. The shaft 47 is connected to a universal joint 48, which in turn is connected to a short extension shaft 49, which is connected to a flange coupling 50 on the buoyant member 32.

Each buoyant member, such as the member 31 is supported transversely by locating means in turn are supported by a backboard indicated generally at 51. The backboard comprises a vertical plane timber member 52 which may be formed of planks or of a sheet of plywood and which is reinforced at the rear by beams 53. The backboard is held in a substantially vertical position by means of vertical piles 54, which have been driven into the bed of the body of liquid in which it is desired to produce the waves.

Projecting from one surface of the member 52 are U-shaped brackets 55 having horizontal flanges 56 which are spaced apart vertically and which, adjacent their free ends, are joined by elongated bolts 57. As will be seen from FIGURES 1 and 2, the extension shafts 39 and 49 are each located between the base of a U-shaped bracket 55 and its bolt 57, so that the floating buoyant member is constrained in its movement across the surface 58 of the liquid as clearly indicated in FIGURE 2. Also, due to the vertical spacing between the horizontal flanges 56, the buoyant member may rise and fall wih changes in level of the surface 58, such movement being limited only when the shafts 39 and 49 come into contact with one or other of the horizontal flanges 56.

The motor 44 and the reduction gear 43, which are anchored to the bed of the body of liquid by means of a support indicated generally at 59, are driven to rotate the floating buoyant member in a direction as indicated by the arrow 60 in FIGURE 2. The machine may consist of any convenient number of buoyant members 31, 32 joined by universal joints as shown. The backboard 51 extends for the combined length of the buoyant members. As the floating buoyant members 31, 32, etc., are rotated in the direction of the arrow 60 in FIGURE 2 they will tend to move towards the backboard 51 but, due to a hydraulic phenomenon, the buoyant members will not contact the backboard but will remain in front of it by a short distance and will produce surface waves, indicated by the chain lines 61 in FIGURE 1, which will move away from the backboard. Each cross-section of the buoyant members will describe eccentric rotations; the waves are caused by the periodic variation in displacement of liquid which occurs at any given point along the buoyant members during their rotation, although the liquid displacement of each buoyant member as a whole remains constant. The backboard 51 prevents the propagation of waves in a direction to the left thereof in FIGURE 2. When the machine is not in operation, the bolts 57 will prevent the buoyant members from floating away from the backboard. The floating members are tethered by the drive shaft 41 and under working conditions, transverse motion is prevented by the backboard 51.

Figure 4:
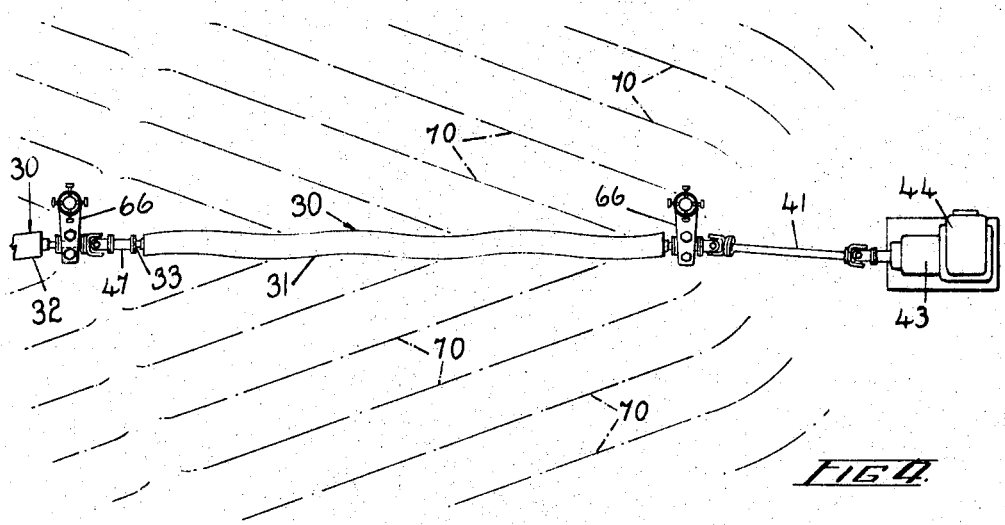
FIGURE 4 is a plan view of a second embodiment of the wave machine arranged to produce waves in two directions simultaneously.
Figure 5:
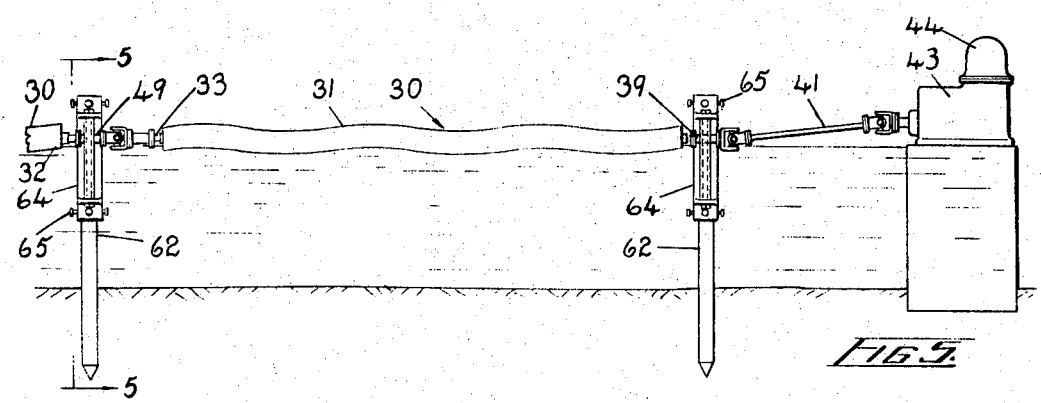
FIGURE 5 is a side elevation of the machine of FIGURE 4.
Figure 6:
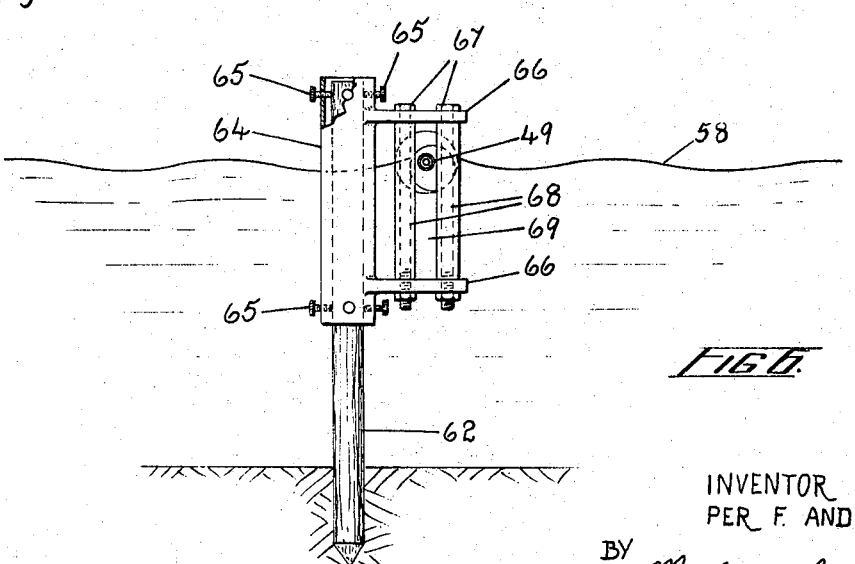
FIGURE 6 is a cross-sectional view on the line 6–6 of FIGURE 5.
Figure 9:
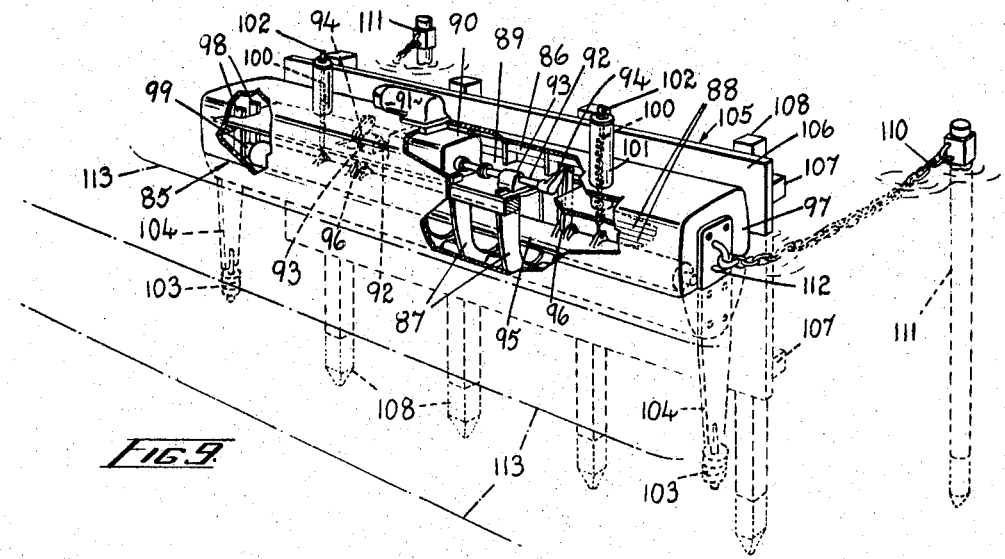
FIGURE 9 is a perspective view of a wave machine constituting a further embodiment of the invention and arranged to produce waves to one side only.
Figure 10:
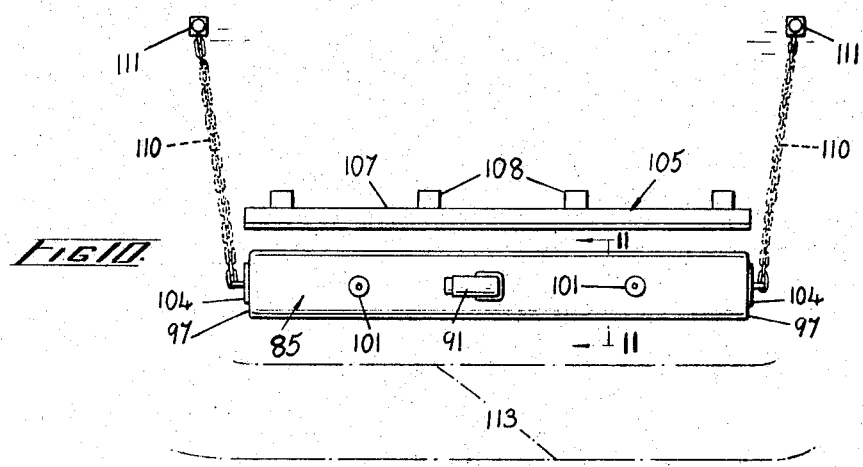
FIGURE 10 is a plan view of the machine shown in FIGURE 9.
Figures 11, 12:
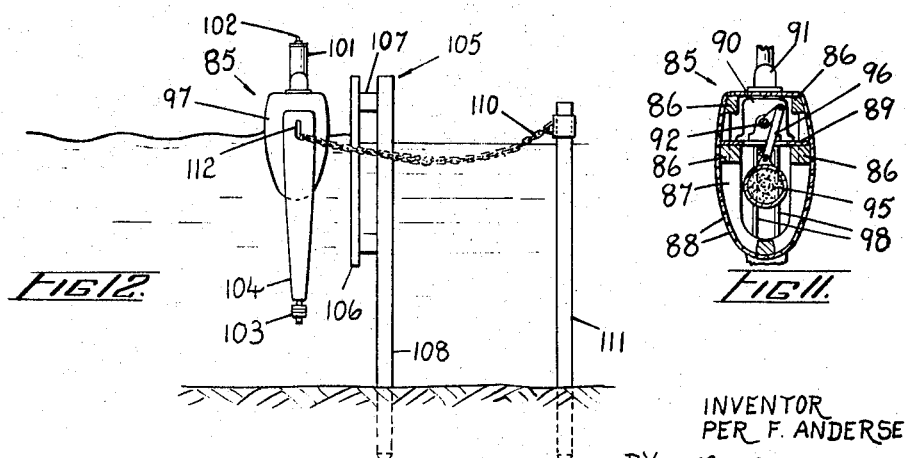
FIGURE 11 is a cross-sectional view taken on the line 11–11 of FIGURE 10.
FIGURE 12 is a side elevation of the machine of FIGURES 9, 10 and 11.

Referring now to FIGURES 4, 5 and 6, these show a wave machine which is similar to that shown in FIGURES 1, 2 and 3 but which is arranged to propagate waves in two directions simultaneously. Identical parts in the two machines are indicated by the same reference numerals. Thus there are one or more buoyant members generally indicated at 30, two being specifically indicated at 31 and 32; they are driven by means of an electric motor 44 through a reduction drive 43 and a shaft 41. The buoyant members are restrained from substantial movement across the surface of the liquid by locating means which comprise vertical piles 62 driven into the bed of the body of liquid. A sleeve 64 fits over the top of each pile 62 and is secured in position by means of bolts 65 which engage the pile. Extending from each sleeve 64 is a pair of horizontal lugs 66 and these are vertically spaced apart and are connected by a pair of parallel vertical bolts 67 having bronze sleeves 68 arranged thereon. The sleeves define between them a vertical slot 69. The extension shafts 39 and 49 are received in slots 69 of two adjacent pile assemblies. It will be seen from FIGURE 6 that the extension shafts are allowed to move vertically but are restrained from substantial movement across the surface 58 of the liquid by the bronze sleeves 68.

Rotation of the buoyant members 31, 32, etc., by means of the motor 44 and the reduction drive 43 will cause oscillating variations in displacement of liquid at any given point along the floating buoyant members, and will produce waves on both sides of the buoyant members as indicated in FIGURE 4 by the chain lines 70.

In the machines so far described, each portion of the buoyant member is in the form of a continuous helix having as its axis the axis of the shaft 33. As mentioned above, it also is desirable that the buoyant member shall, in total, constitute a whole number of turns of the helix so that it is balanced.

In FIGURES 7 and 8 are illustrated two alternative buoyant members which can be substituted for the buoyant members of the wave machines of FIGURES 1 and 4.

Referring first to FIGURE 7, the buoyant member there shown and indicated generally at 71 comprises two parts 72 and 73 which are helical and of opposite hand. The parts are made in the manner described above with respect to the buoyant member 31, with discs 74 secured to a central shaft 75 and completed by laths and by reinforced plastic. Thus, a cross-sectional view on the line A—A of FIGURE 7 is identical to what is illustrated in FIGURE 3 (the reference numbers being ignored). It will be seen that the centres of the discs 74 in the part 72 follow a clockwise helix, whereas the centres of the discs 74 in the part 73 follow a counter-clockwise helix.

Each part 72, 73 constitutes a single turn of a helix as shown, but could constitute any convenient number of turns. It is desirable that, where helical portions of different hand are used, each portion constitutes a whole number of turns.

The buoyant member of FIGURE 8, which is generally indicated at 76, comprises a number of cylindrical parts 77, 78, 79, 80, 81, 82 and 83. The parts are arranged so that the straight lines formed by the centres of gravity of the cross-sections of each part will extend parallel to the main shaft 84 of the portion but will be displaced in different directions therefrom. Thus the centres of gravity of the corresponding ends of the sections, for example the ends 77a, 78a, 79a, 80a, 81a, 82a and 83a lie on a helix. The arrangement is such that, considered as a whole, the portion is in static balance about the main shaft 84. Preferably the end parts 77 and 83 are of a length which is half that of the remaining parts, the remaining parts being of equal lengths.

The buoyant members shown in FIGURES 7 and 8 may be mounted either as shown in FIGURES 1 and 2 or as shown in FIGURES 4 to 6 so as to produce waves either in one direction or in two directions simultaneously.

It will be appreciated that a wave machine may have a single one of the buoyant members so far described or a plurality of such members arranged end-to-end.

The buoyant members described may be considered as threaded bodies and it will be understood that variations in the pitches of the helices or, in the case of FIGURE 8, in the pitch of the helix on which the ends of the cylindrical parts lies, will produce bends in the wave crests. The height and the length of the waves produced may also be influenced to some extent by varying the weight of the buoyant members and the angular velocity at which they are rotated. In order to obtain the desired partial immersion of a buoyant member suitable weights may be embodied in it.

In the machines so far described, the buoyant members have been of the preferred circular cross-sections, but other cross-sections, such as elliptical and polygonal cross-sections, can be used so long as the same cross-section is repeated throughout the length of a buoyant member. The buoyant members can also be made from materials other than described so long as the finished members are buoyant and have acceptable configurations. Thus, it is possible to make the buoyant members primarily of reinforced rubber, or of synthetic rubber, such as neoprene. Alternatively, the buoyant members might be molded of synthetic resinous material, such as polyethylene or, in different constructions, they might be made from wood or metal.

The buoyant members have been described as being rotated while being located by supports which are fixed to the bed of the liquid body in which the waves are to be produced. However, the backboard, where provided, the locating means and also the electric motor or other prime mover may be supported on floats, so long as the latter are well anchored and are constructed so as to resist overturning due to the reaction of the buoyant members during their rotation.

Referring now to FIGURES 9 to 12, these show a further embodiment of the invention in which the wave machine includes a buoyant member as shown and indicated generally at 85. The buoyant member is built up from four long wooden beams 86 to which are glued a number of ribs, some of which are indicated at 87. Nailed and secured by adhesive to the peripheries of the ribs are a number of laths 88, and the laths are covered with a covering of reinforced plastic (not shown) so that the buoyant member is substantially closed and water tight.

Secured to the lower beams 86 is a base plate 89 on which is mounted a reduction drive 90 connected to an electric motor 91. The reduction drive 90 is connected to shafts 92 which are mounted in bearing blocks 93 on the base plate; the ends of the shafts 92 are provided with cranks 94. The cranks 94 are connected to a weight 95 by means of connecting rods 96; the weight 95 is conveniently formed as a steel tube filled with concrete.

End plates 97 of the buoyant member are provided with vertical tracks, one of which is shown at 98 and the ends of the weight 95 are provided with projections 99 which run in the tracks 98. The weight thus is guided for vertical movement within the buoyant member.

Secured to the weight are the lower ends of two tension springs 100 which are mounted in housings 101 extending upwardly from the upper surface of the buoyant member. The upper ends of the springs are connected to threaded rods 102 in the tops of the housings, the rods 102 being adjustable to vary the tensions in the springs.

The buoyant member is maintained in a substantially vertical position in the liquid by means of counterweights 103, which are mounted on brackets 104 secured to the end plates 97.

The buoyant member is located in front of a backboard indicated generally at 105 and comprising a plane vertical board 106 reinforced by beams 107 which are secured to vertical piles 108.

The buoyant member is moored in front of the backboard 105 by means of two chains 110, which constitute flexible links, and by means of two vertical piles 111.

One end of each chain is connected to an eye 112 on one of the brackets 104 and the other end of the chain is secured to one of the vertical piles 111. The two piles 111 are arranged behind the backboard 105 at a spacing somewhat greater than the length of the backboard. It will be seen that the backboard 105 and the chains 110 prevent substantial movement of the buoyant member across the surface of the liquid while allowing it to oscillate vertically and to rise and fall with changes in the level of the liquid.

In operation, rotation of the shafts 82 by the motor 91 will result in rotation of the cranks 84 and in oscillation of the weight 95 relative to the buoyant member 85, in such a way that the centre of gravity of the whole assembly moves up and down when the buoyant member is held in floating position. Because of the principle that action and reaction are equal and opposite, the free-floating buoyant member will receive an oscillating acceleration up and down which will cause an oscillating variation in its displacement of liquid and, therefore, result in wave action. The waves will move away from the backboard following the lines indicated at 113 in FIGURES 9 and 10. The waves will be propagated only to the left of the backboard as viewed in FIGURE 12, since the backboard will prevent propogation of waves in the opposite direction in the manner described in relation to FIGURES 1 and 2.

Referring now to FIGURES 13 to 15, these show a further embodiment of the machine in many respects similar to that shown in FIGURES 9 to 12, the main difference being that the prime mover in this instance is mounted on the weight to oscillate therewith. Parts of the embodiment of FIGURES 13 to 15 which are identical to the same parts in FIGURES 9 to 12 will be indicated by the same reference numerals.

The machine shown on FIGURES 13 to 15 comprises a a buoyant member 85 and a weight 95 which are substantially similar to those shown in FIGURES 9 to 12. The weight 95 has mounted thereon a base plate 114 on which is mounted the reduction drive 90, the motor 91, the shaft 92 and the cranks 94. The connecting rods 96 are connected between the cranks 94 and pivot pins 115 which are mounted in upstanding housings 116 on the top of the bouyant member. The weight is again partially supported by the springs 100 connected as before. In addition to the weight being guided by the tracks 98, it also is guided by rollers 109 mounted in the buoyant member to co-act with the weight. It is apparent that rotation of the shaft 92 will cause vertical oscillations of the weight relative to the bouyant member and that the latter will produce wave action on the supporting liquid in the same manner as described in relation to FIGURES 9 to 12.

The buoyant member is moored in position by means of two floats or buoys 117 which are connected to the ends of the buoyant member by flexible links or chains 118. Each of the buoys is anchored in position by three anchors indicated at 119 and by further chains or flexible links 120.

The will be apparent that the locating means which is constituted by the floats or buoys and by the various chains will prevent substantial movement of the floating buoyant member across the surface of the liquid, but will allow the buoyant member to oscillate vertically and to rise and fall with changes in the level of the liquid. The waves produced by the machines of FIGUES 9 to 15 if the machines are installed as illustrated in FIGURES 13 and 14, will propagate in all direction as indicated by the chainlines 121 which represent wave crests (see FIGURE 13).

Various modifications may be made to the structures described with reference to FIGURES 9 to 15. Thus the moveable weight my, if desired, be suspended outside the buoyant member and the shape of the buoyant member and the materials of its construction may be altered so long as the moveable weight is supported by the buoyant member. Moreover, the springs may be omitted from the wave machine and depending on the guidance provided for the motion of the moveable weight relative to the buoyant member, the wave machine may function with only one crank and one connection rod.

In any of the machines described which produce waves to one side only, any existing straight wall bordering on the liquid body may serve as the backboard.

Various installations of wave machines embodying the invention will now be described with reference to FIGURES 16 to 20.

Referring to FIGURE 16, this shows a plan view of a representative harbour indicated generally at 122 and having walls 123, 124, and 125; the harbour entrance is indicated at 126. The shoreline is indicated at 127 and a typical ice condition has been indicated by showing landfast ice in the general area between the ice edge 128 and the shore 127 and open water to the left of the ice edge 128. A wave machine 129 and a backboard 130 face the harbour entrance. The wave machine is arranged to produce waves, indicated by the lines 131, which will travel across the harbour area and out through the harbour entrance 126. The direction of wave propagation has been indicated by the arrow 132. Near the shore to one side of the harbour entrance, a second wave machine 133 with a backboard 134 has been installed to produce further waves, indicated by the lines 135, which will travel towards the open water, thereby maintaining an ice-free channel bordered by ice edges 136. The direction of wave propagation has been indicated by the arrow 137.

In the arrangement shown in FIGURE 16, the wave machine 129 will keep the harbour ice-free and will partially free the access channel. Because the size of waves allowed in the harbour area is limited, the wave machine 133, producing larger waves, has been installed outside the harbour to keep all of the access channel free of ice.

From the forgeoing description of ice control by wave action, it will be apparent that the wave machine shown in FIGURE 16 may serve to combat different types of ice conditions. The wave action may, for example, serve to break up thin ice in the harbour area and transport the broken ice out of the area, or prevent floating ice brought into the harbour area during a storm from freezing together to form a continuous ice cover. The wave action from the wave machine can also prevent stagnation and pollution of water in the harbour basin and may serve to keep the harbour clean by transporting floating oil and debris out of the harbour.

FIGURE 17 denotes in plan view a river having a sinuous course bordered by shorelines 137. A wave machine 138 is mounted in front of a backboard 139 in an inlet 140 of the river. Waves propagating from the wave machine are made to follow the course of the river by reflection boards which are of similar construction as the backboard previously described; two of the reflection boards are indicated at 141. Waves issuing from the wave machine and indicated by the lines 142 are reflected by the first reflection board 141 with an angle of reflection equal to the angle of incidence and they travel as reflected waves 143 to the second reflection board 141 from which they are propagated as reflected waves 144.

Thus, it is possible to retain the wave energy from a single wave machine for a considerable length of river. The wave action originating from the wave machines may serve to aerate the river water.

In some rivers, certain localities with low flow velocities may show a repeated tendency to collect floating ice which may form barriers for the river flow and cause floods. Wave action from a wave machine installed in such a location may serve to keep the floating ice in motion, thereby preventing the formation of ice barriers.

FIGURE 18 shows a plan view of a canal which is bordered by vertical side walls 145. A wave machine 147 which propagates waves in the direction of the arrow 148 has been installed in an alcove 146 in the canal wall so as not to obstruct the canal. The wave energy produced by the wave machine will be bounced off the side walls repeatedly to proceed along the canal as indicated by arrows 149 and provide aeration of the water or prevent ice formation in the canal. The waves may also provide transportation of floating matter along the canal.

FIGURES 19 and 20 indicate a pool of water which may form either a water reservoir, an aeration tank, a swimming pool or a closed canal used for transport of floating goods. The pool is bordered by side walls 150. A wave machine 153 is installed at one end of the pool in front of a vertical end wall 151. At the other end of the pool opposite to the wave machine a sloping face 152 formed by precast concrete slabs extends from below to above the water level. The sloping face 152 may also be incorporated in the shape of the pool.

Waves from the wave machine 153 will travel the length of the pool and break upon the sloping face 152, setting up a flow pattern consisting of mass transport in the upper layers of the water body as indicated by arrows 154 and a returning flow along the bottom of the pool, as indicated by arrows 155.

Any floating matter which is placed in the pool will be transported by the mass transport flow to the sloping face 152 and may be retrieved either along the sides of the pool or on the sloping face. Mixing and flow caused by wave action in the pool may also serve to aerate the water in the pool.

The specific arrangements of wave machine installations described in the foregoing are typical and serve to demonstrate the new wave machine installations for ice prevention, aeration of liquid and transport of floating matter.

What I claim as my invention is:

1. A machine for making waves on the free surface of a body of liquid comprising, an elongated member which is buoyant in the liquid and which, when the machine is in use, is at least partially immersed in the liquid and floats thereon in a horizontal attitude so as to be free to make vertical movements with the liquid level as the latter changes, driving means connected to the buoyant member to cause rotation thereof about a rotary axis parallel to the elongated direction of the buoyant member whilst permitting said vertical movements, portions at least of the buoyant member having cross-sections in planes transverse to the rotary axis which are asymmetrical about the rotary axis so that rotation of the buoyant member about the rotary axist causes local variations in the liquid displacement of the floating buoyant member, and locating means for preventing movement of the buoyant member across the surface of the liquid outside predetermined limits while allowing said vertical movements of the buoyant member.

2. A machine for making waves on the free surface of a body of liquid according to claim 1, wherein the driving means include a drive shaft and a first and a second universal joint at respective ends of the drive shaft, the first universal joint connecting the buoyant member to the drive shaft and the second universal joint connecting the drive shaft to a prime mover.

3. A machine for making waves on the free surface of a body of liquid comprising, an elongated member which is buoyant in the liquid and which, when the machine is in use is at least partially immersed in the liquid and floats thereon in a horizontal attitude so as to be free to make vertical movements with the liquid level as the latter changes, driving means connected to the buoyant member to cause rotation thereof about a rotary axis parallel to the elongated direction of the buoyant member whilst permitting said vertical movements, the buoyant member having a cross-section in any plane transverse to the axis of substantially constant area and wherein the centres of gravity of adjacent cross-sections of a length of the buoyant member lie on a helix with said rotary axis for its axis, and locating means for preventing movement of the buoyant member across the surface of the liquid outside predetermined limits while allowing said vertical movements of the buoyant member.

4. A machine for making waves on the free surface of a body of liquid according to claim 3, wherein a line passing through said centres of gravity from one end of the buoyant member to the other constitutes a whole number of turns of uniform pitch of said helix.

5. A machine for making waves on the free surface of a body of liquid according to claim 3, wherein said cross-section of the buoyant member is circular.

6. A machine for making waves on the free surface of a body of liquid comprising, an elongated member which is buoyant in the liquid and which, when the machine is in use, is at least partially immersed in the liquid and floats thereon in a horizontal attitude so as to be free to make vertical movements with the liquid level as the latter changes, driving means connected to the buoyant member to cause rotation thereof about a rotary axis parallel to the elongated direction of the buoyant member whilst permitting said vertical movements, the buoyant member having a circular cross-section in any plane transverse to the rotary axis of substantially constant area and wherein the centres of gravity of adjacent cross-sections of a length of the buoyant member lie on a helix having said rotary axis for its axis, and wherein a line passing through said centres of gravity from one end of the buoyant member to the other constitutes a whole number of turns of uniform pitch of said helix, and locating means for preventing movement of the buoyant member across the surface of the liquid outside predetermined limits while allowing said vertical movements of the buoyant member.

7. A machine for making waves on the free surface of a body of liquid comprising, an elongated member which is buoyant in the liquid and which, when the machine is in use, is at least partially immersed in the liquid and floats thereon in a horizontal attitude so as to be free to make vertical movements with the liquid level as the latter changes, driving means connected to the buoyant member to cause rotation thereof about a rotary axis parallel to the elongated direction of the buoyant member whilst permitting said vertical movements, the buoyant member being formed of a number of elongated portions arranged end-to-end, the portions having cross-sections transverse to the axis which are of substantially constant area, the centres of gravity of adjacent cross-sections of each portion lying on a helix having said rotary axis for its axis, and the centres of gravity of at least two of said portions lying on helices of opposite hand, and locating means for preventing movement of the buoyant member across the surface of the liquid outside predetermined limits while allowing said vertical movements of the buoyant member.

8. A machine for making waves on the free surface of a body of liquid according to claim 7, wherein a line passing through the centres of gravity of the cross-sections of each of said portions constitutes a whole number of turns of uniform pitch of said helix.

9. A machine for making waves on the free surface of a body of liquid according to claim 7, wherein said cross-sections of the buoyant member are circular.

10. A machine for making waves on the free surface of a body of liquid comprising, an elongated member which is buoyant in the liquid and which, when the machine is in use, is at least partially immersed in the liquid and floats thereon in a horizontal attitude so as to be free to make vertical movements with the liquid level as the latter changes, driving means connected to the buoyant member to cause rotation thereof about a rotary axis parallel to the elongated direction of the buoyant member, the buoyant member being formed of a number of elongated portions arranged end-to-end, the portions having identical circular cross-sections transverse to the axis, such cross-sections being of substantially constant area along said axis, the centres of gravity of adjacent cross-sections of each portion lying on a helix of uniform pitch and of a whole number of turns having said rotary axis for its axis, and the centres of gravity of at least two of said portions lying on helices of opposite hand, and locating means for preventing movement of the buoyant member across the surface of the liquid outside predetermined limits while allowing said vertical movements of the buoyant member.

11. A machine for making waves on the free surface of a body of liquid comprising, an elongated member which is buoyant in the liquid and which, when the machine is in use, is at least partially immersed in the liquid and floats thereon in a horizontal attitude so as to be free to make vertical movements with the liquid level as the latter changes, driving means connected to the buoyant member to cause rotation thereof about a rotary axis parallel to the elongated direction of the buoyant member whilst permitting said vertical movements, the buoyant member being formed of a number of elongated portions arranged end-to-end, the portions having cross-sections transverse to the axis which are of substantially constant area, the centres of gravity of the cross-sections of each portion lying on a straight line parallel to said axis, said straight lines formed by some of said portions being displaced from said axis in directions different from directions in which said straight lines formed by others of the portions are displaced from the axis, and locating means for preventing movement of the buoyant member across the surface of the liquid outside predetermined limits while allowing said vertical movements of the buoyant member.

12. A machine for making waves on the free surface of a body of liquid according to claim 11, wherein said cross-sections are circular.

13. A machine for making waves on the free surface of a body of liquid according to claim 11, wherein the portions are arranged around the rotary axis so that the buoyant member is in static balance about the rotary axis.

14. A machine for making waves on the free surface of a body of liquid comprising, an elongated member which is buoyant in the liquid and which, when the machine is in use, is at least partially immersed in the liquid and floats thereon in a horizontal attitude so as to be free to make vertical movements with the liquid level as the latter changes, driving means connected to the buoyant member to cause rotation thereof about a rotary axis parallel to the elongated direction of the buoyant member whilst permitting said vertical movements, the buoyant member being formed of a number of cylindrical portions of constant diameter, arranged end-to-end, the centreline of each cylindrical portion being parallel to said axis and displaced from said axis, the centres of corresponding ends of the cylindrical portions lying on a helix with said rotary axis for its axis, the cylindrical portions being arranged around the rotary axis so that the buoyant member is in static balance about the rotary axis and all the cylindrical portions being of equal length parallel to the rotary axis except the portions at the ends of the buoyant member which have half the length of the remaining portions, and locating means for preventing movement of the buoyant member across the surface of the liquid outside predetermined limits while allowing said vertical movements of the buoyant member.

15. A method of producing mass transport and aeration in surface layers of a body of liquid having a free surface comprising, floating an elongated buoyant structure of helical configuration on the liquid to displace the liquid at said surface over an elongated zone, preventing movement of said buoyant structure across said surface outside predetermined limits whilst allowing the structure to make vertical movements with the liquid level as the latter changes, and rotating said buoyant structure about an axis generally parallel to its elongated direction to cause substantial variations in liquid displacement of said floating buoyant structure and thus generating waves on said liquid surface.

References Cited

UNITED STATES PATENTS

| | | | |
|---|---|---|---|
| 888,924 | 5/1908 | Pierce | 61—1 |
| 1,316,150 | 9/1919 | Firme | 61—1 |
| 2,002,043 | 5/1935 | Price | 272—26 |
| 2,222,010 | 11/1940 | Witte et al. | 272—26 |

FOREIGN PATENTS

| | | |
|---|---|---|
| 309,121 | 6/1933 | Italy. |
| 169,274 | 8/1934 | Switzerland. |

DAVID J. WILLIAMOWSKY, Primary Examiner

J. K. BELL, Assistant Examiner